United States Patent
Conrow et al.

(10) Patent No.: US 9,327,537 B2
(45) Date of Patent: May 3, 2016

(54) SYSTEM FOR ADJUSTING OPERATION OF A PRINTER DURING THREE-DIMENSIONAL OBJECT PRINTING USING AN OPTICAL SENSOR

(71) Applicant: Xerox Corporation, Norwalk, CT (US)

(72) Inventors: Brian R. Conrow, Webster, NY (US);
Howard A. Mizes, Pittsford, NY (US);
Paul A. Hosier, Rochester, NY (US);
Jeffrey J. Folkins, Rochester, NY (US);
Robert J. Kleckner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/298,232

(22) Filed: Jun. 6, 2014

(65) Prior Publication Data

US 2015/0352872 A1    Dec. 10, 2015

(51) Int. Cl.
*B41J 29/38* (2006.01)
*B41J 29/393* (2006.01)
*B29C 67/00* (2006.01)
*B33Y 50/02* (2015.01)

(52) U.S. Cl.
CPC .......... *B41J 29/393* (2013.01); *B29C 67/0059* (2013.01); *B29C 67/0088* (2013.01); *B33Y 50/02* (2014.12)

(58) Field of Classification Search
None
See application file for complete search history.

(56) References Cited

U.S. PATENT DOCUMENTS

| 5,490,962 A | 2/1996 | Cima et al. |
|---|---|---|
| 7,931,914 B2 | 4/2011 | Pryce Lewis et al. |
| 8,017,055 B2 | 9/2011 | Davidson et al. |
| 2002/0008335 A1* | 1/2002 | Leyden et al. .......... B29C 41/12 264/494 |
| 2010/0125356 A1* | 5/2010 | Shkolnik et al. ................ 700/98 |

* cited by examiner

*Primary Examiner* — Erica Lin
(74) *Attorney, Agent, or Firm* — Maginot Moore & Beck LLP

(57) ABSTRACT

A printer compensates for printing errors occurring during production of the layers for the formation of an object in a three-dimensional printer. The printer includes an optical sensor that generates data corresponding to edges of each layer of the object after each layer is printed. Differences between the raster data used to eject the material to form a layer and the data received from the optical sensor are used to modify the raster data that operates a printhead to form a next layer in the object.

13 Claims, 3 Drawing Sheets

SYSTEM FOR ADJUSTING OPERATION OF A PRINTER DURING THREE-DIMENSIONAL OBJECT PRINTING USING AN OPTICAL SENSOR

TECHNICAL FIELD

The device disclosed in this document relates to printers that produce three-dimensional objects and, more particularly, to the accurate production of objects with such printers.

BACKGROUND

Three-dimensional printing is a process of making a three-dimensional solid object of virtually any shape from a digital model. One approach to three-dimensional printing uses an additive process in which one or more printheads eject successive layers of material on a substrate in different shapes. This approach to three-dimensional printing is also known as additive manufacturing. The substrate is either supported on a platform that can be moved in either one, two, or three dimensions by operation of actuators operatively connected to the platform. Additionally or alternatively, the printhead or printheads are also operatively connected to one or more actuators for controlled movement of the printhead or printheads to produce the layers that form the three-dimensional object. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is inconsistency between the actual dimensions of the printed part and the intended dimensions of the printed parts. These inconsistencies arise because the ejected ink material can flow away from its intended position when jetting onto the growing part. Other factors include thermal expansion and/or contraction of the material as hot ink is ejected onto the part and then is cooled or cured. During printing of an object, one or more inkjets can deteriorate by ejecting the material at an angle, rather than normal, to the printhead, ejecting drops that are smaller or larger than an inkjet should eject, or by failing to eject any drop at all. Other sources of error that occur during object printing include mechanical runout, mechanical shrinkage of the ejected material, vibration, and the like. Dimensional accuracy of an object is currently controlled by monitoring and verifying the accuracy of the movement of the support platform and/or the printhead or printheads. The sources of error identified above, may not be detected from the monitoring of the support platform or printhead(s) movement. If one or more of these sources for error accumulate during object printing, the quality of the printed object may require the object to be scrapped. Because the print jobs can require many hours or multiple days to produce objects, this scrapping of objects can be expensive and time consuming. A printer capable of detecting errors in an object being produced and correcting them during printing would be advantageous.

SUMMARY

An apparatus that detects printing errors and compensates for the errors during a printing operation for producing a three dimensional object in a printer includes an optical sensor configured to generate data corresponding to edges of a top layer of material ejected onto a platen, and a controller operatively connected to the optical sensor, the controller being configured to generate raster image data for layers to be printed to form an object on the platen, and to modify raster image data for layers to be printed with reference to the data received from the optical sensor to compensate for errors in the ejection of the material onto the platen from the ejectors in the printhead.

A printer that incorporates the apparatus that detects printing errors and compensates for the error during a printing operation that produces a three dimensional object includes a platen, a printhead configured with ejectors to eject material onto the platen, an optical sensor configured to generate data corresponding to edges of a top layer of the material ejected onto the platen, and a controller operatively connected to the optical sensor and the printhead, the controller being configured to generate raster image data for layers to be printed to form an object on the platen, to operate the printhead to eject material onto the platen with reference to the raster image data for the layers, and to modify raster image data for layers to be printed with reference to data received from the optical sensor to compensate for errors in the ejection of the material from the ejectors in the printhead.

BRIEF DESCRIPTION OF THE DRAWINGS

The foregoing aspects and other features of an apparatus or printer that detects object printing errors and compensates for them during three-dimensional object printing are explained in the following description, taken in connection with the accompanying drawings.

DETAILED DESCRIPTION

Figure 1:
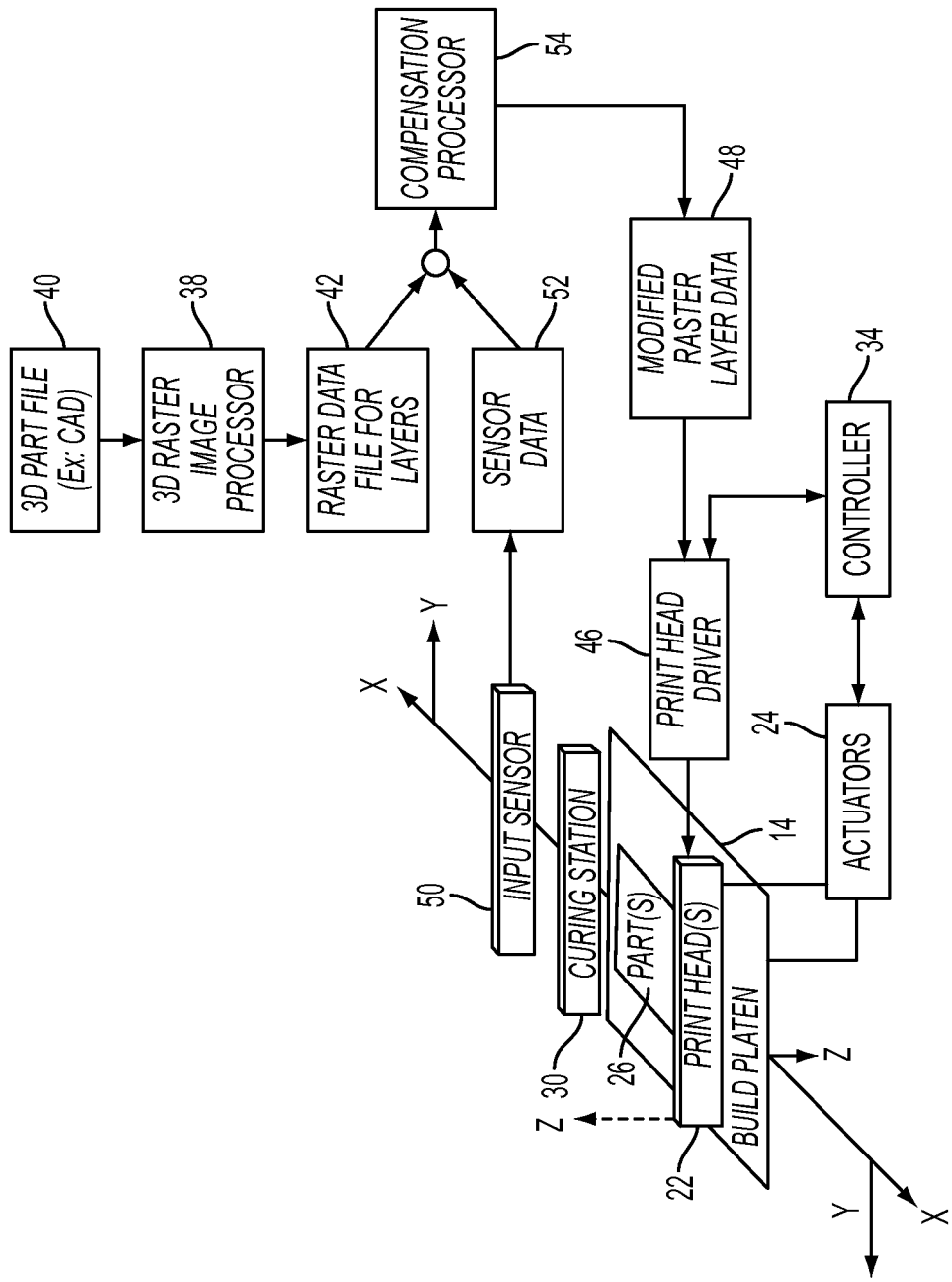
FIG. 1 is block diagram of a three-dimensional object printer that detects object printing errors and compensates for the errors during the object printing operation.

For a general understanding of the environment for the device disclosed herein as well as the details for the device, reference is made to the drawings. In the drawings, like reference numerals designate like elements.

Figure 3:
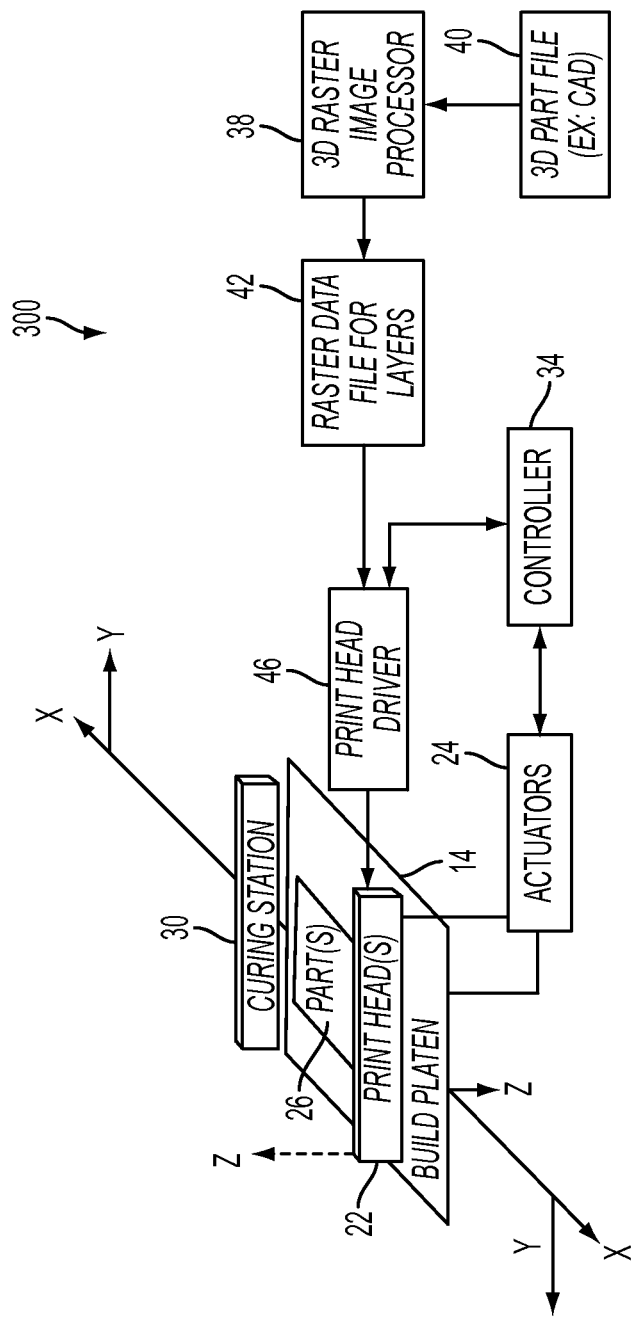
FIG. 3 is a block diagram of a prior art three-dimensional object printer.

FIG. 3 shows a configuration of components in a prior art printer 300, which produces a three-dimensional object or part 26. The printer 300 includes a support platen 14 on which one or more printheads 22 for an object or part 26. The printhead(s) are configured to eject one or more types of build material and support material to form the part 26. These materials can require curing so the printer 300 includes a curing device 30. In some embodiments that eject photopolymer building material, the curing device 30 is an ultraviolet (UV) radiation source. Additionally, a planerizer can be include to normalize the height of material in a layer formed on the object by the one or more printheads 22.

The printhead(s) 22 and support platen 14 are configured with actuators 24 and the like for movement. As shown in the figure, the support platen 14 is configured for movement along an X axis and the printhead(s) is configured to move along a Z axis, although the platen 14 could also be configured for movement along the Z axis. The movement of the platen 14 and the printhead(s) 22 are coordinated by a controller 34, which is operatively connected to the actuators 24 with which the platen and printhead(s) are configured for movement. In the figure, the printhead(s) 22 are wider along a Y axis than the part being built. Consequently, movement along the Y axis is not required. In some embodiments, the printhead(s) are not wider than the part so the platen 14 and/or printhead(s) 22 are configured for movement along the Y axis. In other embodiments, the resolution of the inkjets in the printheads is less than the resolution required for the part. In these embodiments movement is also needed along the Y axis to build up a layer at the resolution required for the part. As used herein, the term "process direction" refers to movement along one axis in the surface of the support platen 14 and "cross-process direction" refers to movement along an axis in the support platen 14 that is orthogonal to the process direction axis in that platen. Thus, the process and cross-process directions in FIG. 3 refer to the X and Y axes. While the platen 14 of FIG. 3 is shown as a planar member, other embodiments of three-dimensional printers include platens that are circular discs, an inner wall of a rotating cylinder or drum, or a rotating cone. The movement of the platen and the printhead(s) in these printers can be described with polar coordinates.

To operate the ejectors in the printhead(s), a three-dimensional raster processor 38 receives a file 40 of three-dimensional data of the part to be produced. These three-dimensional part data can be contained in a computer-aided design (CAD) file, for example. The processor 38 uses these data to generate a raster data file 42, which contains data that correspond to thin layers of the part. The printhead driver 46 receives the raster data file 42 and generates pixelated data that are used to operate the ejectors in the printhead(s) 22 for the ejection of building and support material onto the support platen 14 to form the part layer by layer. The printhead driver 46 and the controller 34 generate signals to coordinate the movement of the platen 14 and the printhead(s) 22 with the operation of the ejectors in the printhead.

As noted above, movement of the platen and printhead(s) in a prior art printer, such as printer 300, is monitored with encoders and the like to enable the controller 34 to control the positioning of those components accurately. Other sources of positional error, either in the components moving the platen and the printhead(s) or in the placement of the drops ejected by the printhead(s) are not detected and can accumulate to a total error that requires the scrapping of the part. Additional contributors to positional error include changes and distortions in the part due to contraction and expansion of part occurring as the part continues to cool after a layer is deposited, the layer is reheated as the subsequent layers are built up, or by the chemistry arising from the curing of the materials in a layer. The magnitude of these contractions and expansions may change as the part is built up because the ability of the part to absorb additional heat changes as the size of the part increases. In printers having a planerizer, inaccuracy in the operation of the planerizer can also contribute to positional error in a layer of an object.

To address these other sources of error, a printer has been developed that detects errors in the formation of the part while the part is being printed and compensates for these errors in subsequent layer printing for the part. One embodiment of such a printer is shown in FIG. 1. Using like reference numerals for like components, the printer 100 includes a platen 14, printhead(s) 22, curing device 30, a controller 34, a raster image processor 38 that generates a raster data file 42, and a printhead driver 46. Additionally, the printer 200 also includes an optical sensor 50 and a compensation processor 54.

In embodiments in which the one or more printheads 22 eject both build material and support material, optical contrast can typically be detected because the two materials reflect light differently. In these embodiments, the optical sensor can be a optical contrast sensor having a one dimensional or two dimensional array of photodetectors configured with an illumination source. The illumination source directs light at a layer of an object and the array of photodetectors are positioned to receive reflected light from the illuminated layer. Because the materials reflect light differently, the photodetectors receive more light from one of the materials more than they receive from the other material. The photodetectors generate electrical signals, which are converted by an A/D converter or the like, into image data that can be analyzed by a controller. The optical contrast between the two materials can be used to detect edges of the layer and between the materials. In other embodiments, which primarily eject build materials only, the optical sensor can be configured to generate topographical data of the part 26 along with measurements of features in the topographical data. Such a topographical optical sensor can be a blue laser sensor available from Keyence Corporation of America, Itasca, Ill. in the LJ-V7000 series of two dimensional and three-dimensional laser measurement systems. This sensor can generate measurements of the material drops as well as positional data regarding the location of the drops or features formed by the build material drops. Even in embodiments that eject both support and build material and use a planerizer, a topographical optical sensor can be useful to verify the height trimming of the planerizer.

The data from the optical sensor are provided in a data file 52 to the compensation processor 54. The compensation processor 54 generates positional data for edges from the image data of an optical contrast sensor or receives measurement data from a topographical sensor. These data are compared with the data in the raster data file 42 for the layer previously printed and generates the differences between these data. The compensation processor 54 uses these differences to modify the raster data for the next layer to be printed. The printhead driver 46 receives these modified raster data 48 to generate the pixelated data for operating the ejectors in the printhead and to control movement of the platen 14 and the printhead(s) 22. In this manner, the sensor 34 measures the errors occurring in a previously printed layer and the compensation processor 54 adjust data for forming a next layer with these measured error data to compensate for the measured errors and keep the part within tolerances.

For example, if a printer is building a spherical object of a known diameter, the diameter of the circle of a cross section at any height through the material can be obtained from the image data received from an optical contrast sensor or determined with reference to measurement data from a topographical optical sensor. In an embodiment using an optical contrast sensor, the edge of the layer is determined after each layer is printed from the optical contrast in the image data between the support material and the build material. If the diameter of the circle that best fits the measured region is larger than the intended diameter of the part for this layer, then the digital image of the next layer is decreased so that the measured diameter matches the intended diameter. Under some conditions, local changes in heating of the part may cause the perimeter to deviate from a circle. For example, the part may start to show a bulge at some location in the circle. To compensate for this, the raster data is adjusted to form a divot at the bulge location in the next layer so that the intended circular shape can be maintained as the part is built up.

Figure 2:
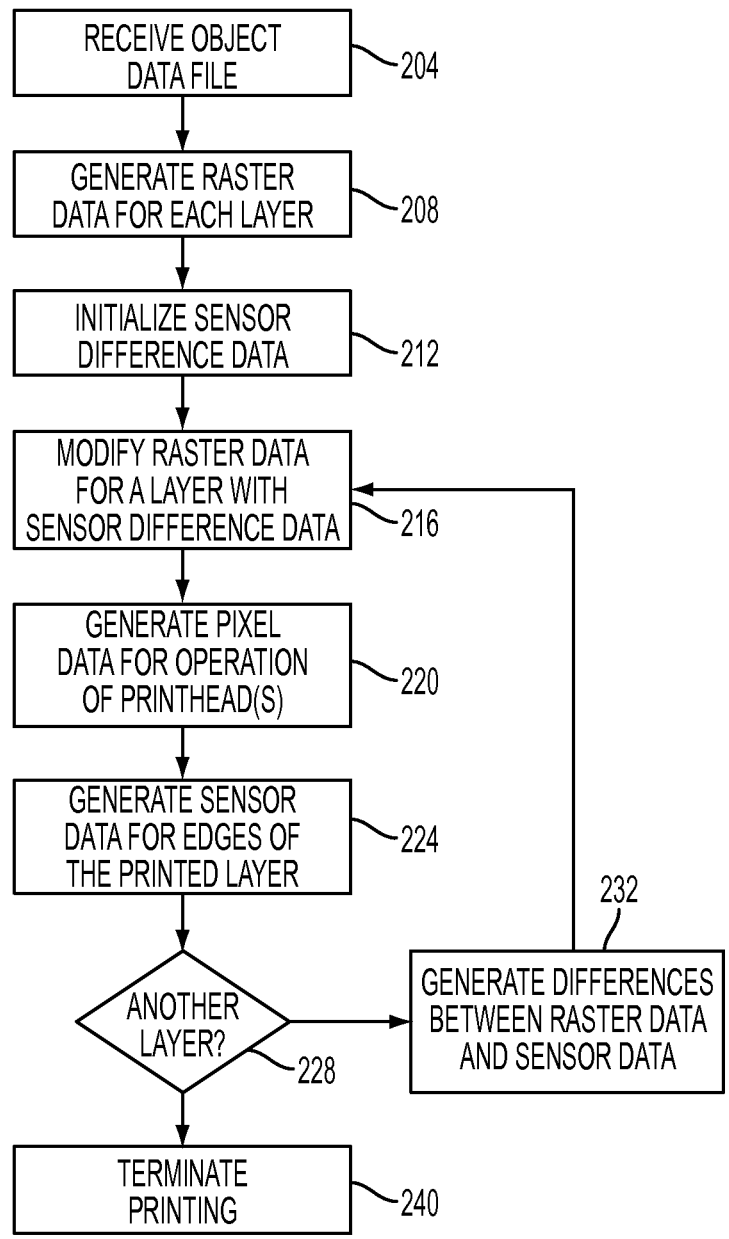
FIG. 2 is a flow diagram of a method for operating the module of FIG. 3.

A method of operating a printer that compensates for measured errors in three-dimensional objects during their printing is shown in FIG. 2. In the description of this method, statements that a process is performing some task or function refers to a controller or general purpose processor executing programmed instructions stored in a memory operatively connected to the controller or processor to manipulate data or to operate one or more components in the printer to perform the task or function. The controllers 34, 38, and 54 noted above can be such a controller or processor. Alternatively, these controllers can be implemented with more than one processor and associated circuitry and components, each of which is configured to form one or more tasks or functions described herein.

At the beginning of an object printing operation, the raster image processor receives a data file of three-dimensional data of a part (block 204). The raster image processor 54 generates raster image data for the layers to be printed to form the part (block 208). For the first layer, no a priori information exists of any distortions that will occur in the layer, so the sensor difference data is initialized to an origin value (block 212). The compensation processor 54 passes the raster image data for the first layer through to the printhead driver 46 (block 216) and the driver generates the pixelated data for operating the ejectors in the printhead and controlling movement of the platen 14 and the printhead(s) 22 (block 220). After one or more layers are printed, the optical sensor generates data corresponding to the edges in the top layer (block 224). These data, as noted above, can be optical contrast image data or topographical and measurement data. The raster image processor 54 determines if another layer is to be printed (block 228), and if another layer is to be printed, the processor compares the data corresponding to the edges with the data in the raster data file 42 for the layer previously printed and generates the differences between these data (block 232). The compensation processor 54 uses these differences to modify the raster data for the next layer to be printed (block 216). If the differences indicate an edge bulges from an intended position of the edge then the compensation processor 54 changes the pixels in the raster image data at the position of the bulging edge in the next layer to be printed to support material pixels. Alternatively, if an edge indicates a divot is forming in the object, then compensation processor 54 converts the support material pixels in a next layer to be printed to build material pixels. The printhead driver 46 receives these modified raster data to generate the pixelated data for operating the ejectors in the printhead and controlling movement of the platen 14 and the printhead(s) 22 (block 220). This compensation scheme continues until no more layers are to be printed (block 228) and the process terminates (block 240).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a platen;
   a printhead configured with ejectors to eject material onto the platen;
   an optical sensor configured to generate data corresponding to edges of a top layer of the material ejected onto the platen; and
   a controller operatively connected to the optical sensor and the printhead, the controller being configured to generate raster image data for layers to be printed to form an object on the platen, to operate the printhead to eject material onto the platen with reference to the raster image data for the layers, to generate differences between the data received from the optical sensor and the raster image data used to operate the printhead to eject material for a previously printed layer of ejected material, and to modify raster image data for layers to be printed with reference to the generated differences between the data received from the optical sensor and the data used to operate the printhead to compensate for errors in the ejection of the material from the ejectors in the printhead.

2. The printer of claim 1 wherein the optical sensor is an optical contrast sensor.

3. The printer of claim 1 wherein the optical sensor is a topographical and measurement sensor.

4. The printer of claim 1 wherein the platen is a planar member.

5. A printer comprising:
   a platen;
   a printhead configured with ejectors to eject material onto the platen;
   an optical contrast sensor having an array of photodetectors and an illumination source, the optical contrast sensor being configured to generate optical image data indicative of optical contrast between a build material and a support material forming the top layer of material ejected on the platen; and
   a controller operatively connected to the optical contrast sensor and the printhead, the controller being configured to generate raster image data for layers to be printed to form an object on the platen, to operate the printhead to eject drops of build material and drops of support material onto the platen with reference to the raster image data for the layers, and to modify raster image data for layers to be printed with reference to data received from the optical contrast sensor to compensate for errors in the ejection of the drops of build material and drops of support material from the ejectors in the printhead.

6. The printer of claim 3, the topographical and measurement sensor further comprising:
   a blue laser sensor.

7. An apparatus that compensates for errors in a printing operation performed by a three-dimensional object printer comprising:
   an optical sensor configured to generate data corresponding to edges of a top layer of material ejected onto a platen; and
   a controller operatively connected to the optical sensor, the controller being configured to generate raster image data for layers to be printed to form an object on the platen, to generate differences between the data received from the optical sensor and the raster image data used to operate the printhead to eject material for a previously printed layer of ejected material, and to modify raster image data for layers to be printed with reference to the generated differences between the data received from the optical sensor and the data used to operate the printhead to compensate for errors in the ejection of the material onto the platen from the ejectors in the printhead.

8. The apparatus of claim 7 wherein the optical sensor is an optical contrast sensor.

9. The apparatus of claim 7 wherein the optical sensor is a topographical and measurement sensor.

10. The apparatus of claim 7 wherein the platen is a planar member.

11. The apparatus of claim 8, the optical contrast sensor further comprising:
   an array of photodetectors; and
   an illumination source.

12. The apparatus of claim 11, the optical contrast sensor being configured to generate optical image data indicative of optical contrast between a build material and a support material forming the top layer of material ejected on the platen.

13. The apparatus of claim 9, the topographical and measurement sensor further comprising:
   a blue laser sensor.

* * * * *